G. E. POLLOCK.
COASTER SLED.
APPLICATION FILED MAY 3, 1920.
1,366,833.
Patented Jan. 25, 1921.
2 SHEETS—SHEET 1.
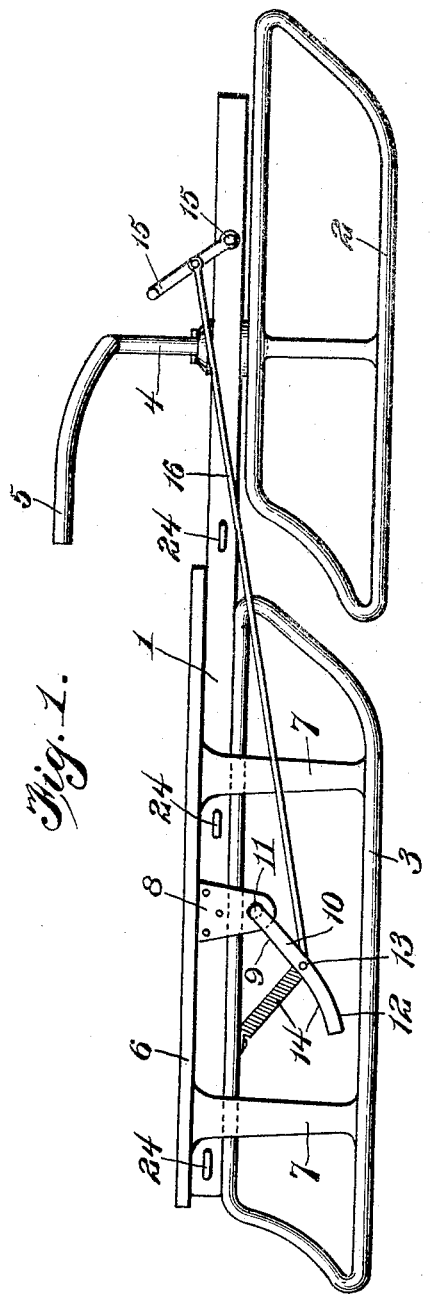
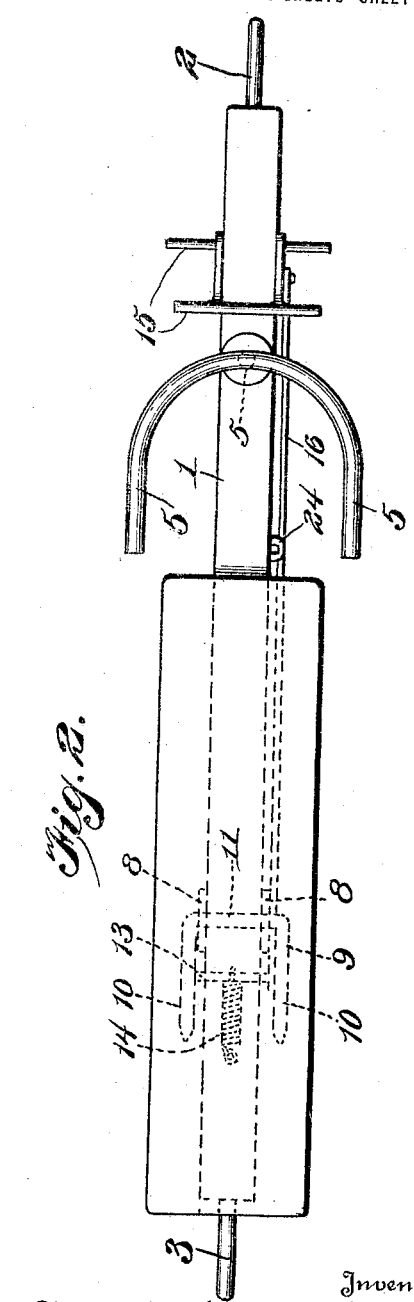
Inventor
Grant E. Pollock
By
Attorney

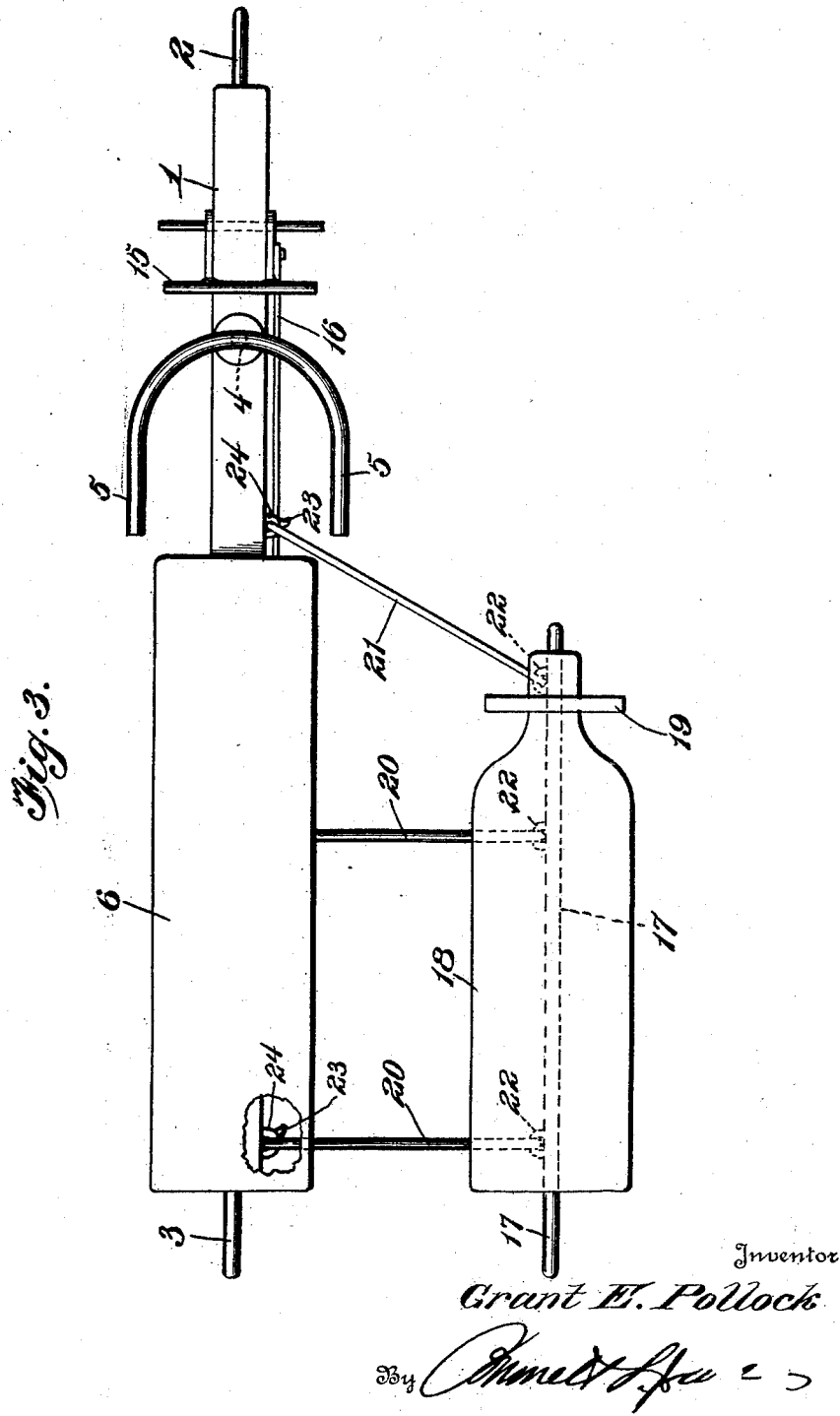

UNITED STATES PATENT OFFICE.

GRANT E. POLLOCK, OF CLINTON, ILLINOIS.

COASTER-SLED.

1,366,833. Specification of Letters Patent. Patented Jan. 25, 1921.

Application filed May 3, 1920. Serial No. 378,439.

*To all whom it may concern:*

Be it known that I, GRANT E. POLLOCK, a citizen of the United States, residing at Clinton, in the county of De Witt and State of Illinois, have invented new and useful Improvements in Coaster-Sleds, of which the following is a specification.

This invention relates to coaster sleds, and one of its objects is to provide a coaster sled which is simple of contruction and may be steered and controlled with great facility.

A further object of the invention is to provide a coaster sled embodying a novel construction of brake whereby the speed of the sled may be controlled and the sled quickly brought to a stop when desired, and also by means of which skidding of the sled may be prevented.

A further object of the invention is to provide a side car or side sled attachment for coaster sleds of the double runner type, which side car or side sled attachment may be quickly and conveniently applied and removed as desired.

The invention consists of the features of construction, combination and arrangement of parts, hereinafter fully described and claimed, reference being had to the accompanying drawings, in which:

Figure 1 is a side elevation of a coaster sled embodying my invention, and with the side car or sled detached.

Fig. 2 is a top plan view of the same.

Fig. 3 is a view similar to Fig. 2 showing the side car or side sled applied for use.

In the practical embodiment of my invention I provide a coaster sled comprising a longitudinally extending frame bar 1, upon the under side of which are arranged front and rear runners 2 and 3, which may be of any suitable form and construction. The rear runner 3 is fixed in any suitable manner to the frame bar 1, while the front runner 2 is mounted upon a steering post 4 journaled upon the frame bar 1 for lateral oscillatory movements and carrying handle bars or the like 5, whereby the runner 2 may be pivotally adjusted to steer the sled in an obvious manner.

Suitably secured to the frame bar 1 above the rear runner 3 is a seat board 6, and if desired braces 7 of suitable character may extend from the runner 3 to this board to mutually stiffen and brace the same so as to provide a sled structure of maximum strength and durability. The runners 2 and 3 are arranged in tracking relationship and are so formed as to diminish their resistance to travel over ice or snow, allowing great speed to be obtained.

Depending from the frame bar 1 of the seat board 6 are bracket members 8 pivotally supporting a brake device 9. This brake device 9 is substantially U-shaped, comprising a pair of brake members or skids 10 connected at their upper ends by a cross piece 11, which is journaled in the bracket member or members 8 so as to adapt the brake to swing forwardly and rearwardly. The brake members or skids 10 curve downwardly or rearwardly at their lower free ends, as indicated at 12, so that their lower surfaces will be brought by downward and forward movement of said brake members into contact with the ice or snow, to exert a braking action thereon, which may be regulated as desired to simply control the speed of the sled or bring it to a quick stop. The brake members are so arranged as to straddle the acting surface of the runner 3, or to come on opposite sides thereof, so that by bringing the brake elements in contact with the ice or snow, when the sled is making a turn, any tendency of the sled to skid or move sidewise will be prevented, and by such use of the brake the tendency of the sled to skid under any and all other conditions may be prevented, thus avoiding liability of accidents under such conditions. A cross pin 13 connects the brake members and connecting this cross pin with the upper portion of the runner 3 on the frame bar 1 is a coiled spring 14 serving to normally hold the brake elevated or out of action. Fulcrumed upon the forward portion of the frame bar 1 is a cross bar 15, forming a foot rest, and which is coupled by a connecting rod or link 16 to the brake device 9, the element 15 thus serving additionally as a foot lever whereby forward movement may be transmitted to the rod 16 to swing the brake device downwardly and forwardly with the desired degree of pressure against the surface of the ice or snow.

It will thus be understood that a sled construction is provided which is of a simple type, and which will allow coasting at great speed, but which may be readily, conveniently and safely controlled to regulate the speed, to bring the sled to a quick stop and to prevent skidding, whereby liability of accidents will be avoided. The seat board 6 may be of a length to hold any desired number of passengers in addition to the driver or operator, and it will be evident that such driver or operator may sit upright and guide or steer the sled in a convenient manner while at the same time maintaining complete control through the lever 15 on the brake device 10.

I provide a side car or side sled attachment, which may be used when desired, and which comprises a runner 17 on which is secured a seat board 18 which may be provided at its forward end with any suitable type of foot rest 19. The runner 17 is designed in practice to be arranged at one side of and in parallel relation to the runner 3, and suitable means is provided for detachably connecting the same with the coaster sled proper. As shown in the present instance bracing or connecting rods 20 are provided to connect the body of the runner 17 at points immediately in front and rear of its transverse center with the runner 3 or frame bar 1, and which are designed to extend at right angles to the runners, while a third connecting or bracing rod 21 is provided to extend at an oblique angle to the main sled and side sled for the purpose of holding the latter rigidly braced and in substantially fixed relation to the main sled. Each of the elements 20 may consist of a rod pivotally connected at one end with the runner 17, as indicated at 22, and provided at its opposite or free end with a hook 23 to engage an eye or keeper member 24 on the frame bar 1, thus allowing the side bar or side sled to be attached or detached from the main sled with facility, so that it may be used or not as desired.

Having thus fully described my invention, I claim:

A coaster sled comprising a main sled including a frame, a rear fixed runner, and a front pivotally mounted steering runner, a side sled adapted to be disposed in parallel relation to the rear runner of the main sled, bracing members extending at right angles from the side sled and detachably connected with the frame of the main sled, and a bracing member connected with the forward portion of the side sled and extending at an oblique angle therefrom and detachably connected with the frame of the main sled.

In testimony whereof I affix my signature.

GRANT E. POLLOCK.